United States Patent [19]

Kitanaka et al.

[11] 4,332,767

[45] Jun. 1, 1982

[54] METHOD FOR PRODUCING THERMOPLASTIC RESIN MOLDED ARTICLES

[75] Inventors: Minoru Kitanaka; Zenji Izumi, both of Nagoya, Japan

[73] Assignee: Toray Industries, Inc., Tokyo, Japan

[21] Appl. No.: 107,833

[22] Filed: Dec. 28, 1979

[30] Foreign Application Priority Data

Dec. 28, 1978 [JP] Japan .............................. 53-163937
Mar. 1, 1979 [JP] Japan .............................. 54-24251
Mar. 1, 1979 [JP] Japan .............................. 54-24252

[51] Int. Cl.³ .............................................. B29B 3/02
[52] U.S. Cl. .................................... 264/322; 264/319
[58] Field of Search ................................. 264/319, 322

[56] References Cited

U.S. PATENT DOCUMENTS 3,286,008 11/1966 Power et al. ...................... 264/322
3,621,092 11/1971 Hofer ................................. 264/322
3,626,053 12/1971 Hofer ................................. 264/322
3,923,948 12/1975 Jackson et al. .................... 264/322
4,034,054 7/1977 Sauer ................................. 264/322

FOREIGN PATENT DOCUMENTS 52-6314 2/1977 Japan .

*Primary Examiner*—Donald E. Czaja
*Assistant Examiner*—W. Thompson
*Attorney, Agent, or Firm*—Austin R. Miller

[57] ABSTRACT

A method for producing thermoplastic resin molded articles is disclosed. The method comprises heating a sheet comprising a crystalline thermoplastic resin, which is crosslinked to a degree of more than about 5%, to a temperature that is higher than the melting point of the crosslinked resin but below the decomposition temperature thereof. The thus pre-heated sheet is press-molded under a pressure of about 50–1,000 kg/cm² by a pair of press mold dies, which are maintained at a temperature below the melting point of the crosslinked resin.

14 Claims, No Drawings

METHOD FOR PRODUCING THERMOPLASTIC RESIN MOLDED ARTICLES

BACKGROUND OF THE INVENTION

The present invention relates to a method for producing press-shaped thermoplastic resin articles. More specifically, the present invention relates to a method for producing press-shaped articles having excellent surface smoothness and mechanical strength.

Heretofore, various methods for producing press-shaped plastics have been known. One method, the so-called SMC process, comprises impregnating a glass fiber mat with a monomer of a thermosetting resin and hardening the monomer by a polymerization reaction after subjecting the impregnated glass fiber mat to a press-shaping operation whereby a shaped article is formed. Another known shaping method, believed to be superior to the SMC process in process productivity, comprises heating a sheet or a film comprising a thermoplastic resin, to a temperature higher than the melting point of the thermoplastic resin, and feeding the treated sheet or film to a pair of mold presses, and rapidly compressing the sheet or film. However, when a crystalline thermoplastic resin, such as poly-$\epsilon$-caprolactam, polyhexamethylene adipamide, polyethylene terephthalate, polybutylene-terephthalate, polypropylene or polyethylene, is applied to the process as described above, the crystalline thermoplastic resin is preferably combined with a glass fiber mat. This is because a preheated thermoplastic resin, without utilization of a glass fiber mat, begins to flow and cannot be manipulated. Nevertheless, a molded article made from a thermoplastic resin combined with a glass fiber mat suffers a serious disadvantage in that the surface smoothness of the article is poor due to the "rising up" of glass strands to the article's surface.

To improve the surface smoothness, several methods have been proposed. Examples include the use of fillers in conjunction with a glass fiber mat or laminating a thermoplastic resinous sheet without a glass fiber mat. However, these methods also have disadvantages. For instance, they are not economically desirable because the process of preparing the composite sheet becomes complex, and neither of these methods sufficiently improves the surface smoothness.

On the other hand, a preheated thermoplastic resinous sheet, without use of a glass fiber mat, can be manipulated when the preheating temperature is lower than the melting point of the resin and the surface smoothness of the molded article is improved. However, this process suffers disadvantages in that the dimensional stability of the molded article is poor and the mechanical equipment for molding is expensive because extremely high pressure is necessary. These methods are disclosed in U.S. Pat. No. 3,621,092, and Japanese Patent Early Publication (Kokai) No. 52-40588.

A method for providing an oriented sheet or film by compressing a crosslinked crystalline thermoplastic resin under a pressure between a pair of hot press mold and cooling the same to room temperature while maintaining the pressure has been proposed in Japanese Patent Publication No. 52-6314. This method may provide a transparent and tough shaped article, but the process productivity is not good and also the energy loss is not negligibly small.

Thus, an object of the present invention is to provide a method for producing press-shaped articles having excellent surface smoothness, mechanical strength and dimensional stability which are free from the disadvantages described above. Another object is to provide a method for producing such articles, which method has excellent productivity.

DETAILED DESCRIPTION OF THE INVENTION

We have now found that the above mentioned objects are realized by use of a crosslinked thermoplastic resin. Then we complete the present invention. That is, the present invention provides a method which comprises heating a sheet comprising a crystalline thermoplastic resin, which is crosslinked to a degree of crosslinking of more than 5%, to a temperature higher than the melting point of the crosslinked thermoplastic resin and below the decomposition temperature thereof, compressing the preheated sheet by a pair of mold presses, the temperature of which is maintained at a temperature below the melting point of the crosslinked crystalline thermoplastic resin. In the present invention, by providing a crosslinking structure in the crystalline thermoplastic resin, the preheated thermoplastic resin maintains its shape, without flow, and can be readily transferred to the mold. Also, the mechanical strength of the molded article is remarkably improved. In addition, the surface of the molded article is excellently smooth because the molded article contains no glass fiber mat.

As a crystalline thermoplastic resin, polyolefins such as polyethylene and polypropylene, polyamides, such as poly-$\epsilon$-caprolactam, poly-$\omega$-laurolactam, polyhexamethylene adipamide and polyhexamethylene sebacamide, thermoplastic polyesters, such as polyethylene terephthalate, polybutylene terephthalate, poly(ethylene-2,6-naphthalate), polythioethers such as polyphenylene sulphide, etc., and copolymers of these polymers which have sufficient crystallinity can be used in the present invention. However, the range of crystalline thermoplastic resin is not restricted by the above examples as any crystalline thermoplastic resin can be utilized. In the present invention, the crystalline thermoplastic resin may contain heat resistant agents, weathering stabilizers, dyes, pigments, antistatic agents, flame retardant agents, lubricants, mold release agents, nucleating agents, fillers and short fibrous reinforcing agents.

In the present invention it is essential that the crystalline thermoplastic resin has a crosslinking structure. The lowest degree of crosslinking which is required in the present invention varies depending on the kind of crystalline thermoplastic resin and whether or not the crystalline thermoplastic resin contains short fibrous reinforcing agents. The crosslinking must be at least 5%, and preferably more than 30%. When the degree of crosslinking is lower than 5%, the mechanical strength and ease of manipulating the preheated sheet are not sufficient. The higher the degree of crosslinking, the better, as long as the crystallinity of the thermoplastic resin is not decreased by crosslinking. It is preferable that the decrease in the melting point due to crosslinking is less than 30° C. The melting point of a crosslinked crystalline thermoplastic resin can be measured by thermal analysis such as differential scanning calorimetry (DSC).

The degree of crosslinking is evaluated by measuring the weight fraction of the insoluble component in the crosslinked crystalline thermoplastic resin by extracting non-crosslinked linear polymer with a solvent which can dissolve the resin. For example, orthochlorophenol for thermoplastic polyester, formic acid for polyamide, xylene, tetralin or decalin for polyethylene, and tetralin or orthodichlorobenzene for polypropylene, may be used as solvents.

Any crosslinking method, such as irradiating by a high energy beam, for example an electron beam, $\gamma$-ray, X-ray, ultraviolet light, etc., copolymerizing polyfunctional monomers, adding organic peroxide, for example dicumyl peroxide, etc., and combinations of these methods are used for preparing crosslinked crystalline thermoplastic resin.

In the present invention not only is the mechanical strength improved by dispersing short fibrous reinforcing agents homogeneously due to the duplicate effects of crosslinking and reinforcing, but also the surface smoothness of the resultant molded articles is excellent because of the homogeneous dispersion of short fibrous reinforcing agents.

Short fibrous reinforcing agents useful in accordance with this invention are glass fibers, ceramic fibers, asbestos fibers, metallic fibers such as steel, aluminum and copper, whiskers such as boron, alumina, silica, silicon carbide, carbon fibers, aromatic polyamide fibers, synthetic fibers having melting points higher than the matrix resin, and regenerated fibers such as rayon, etc. However, the reinforcing agents are not restricted to the above examples.

The lengths of the short fibrous reinforcing agents are below 25 mm, and preferably below 15 mm. The content of short fibrous reinforcing agents is from 5 to 60%, and preferably from 10 to 45% by volume. Below 5 volume %, the reinforcing effect is not sufficient. Whereas over 60 volume %, the reinforcing effect is saturated and in addition, the moldability and the surface smoothness of the composite material are decreased.

The short fibrous reinforcing agents may be treated with one or more sizing agents of various types which are employed for improving the binding strength between resins and fibers.

Various methods may be employed for preparing the composite materials comprising the crosslinked crystalline thermoplastic resins and short fibrous reinforcing agent, in accordance with the present invention. These methods include: crosslinking the composite compound after mixing the short fibrous reinforcing agent and the crystalline thermoplastic resin in the molten state in an extruder, etc.; polymerizing the crystalline thermoplastic resin in the presence of the short fibrous reinforcing agents, and pressing the mixture of the crystalline thermoplastic powder short fibrous reinforcing agent, and crosslinking agent under a temperature higher than the melting point of the crystalline thermoplastic resin, etc.

The molding process employed in the present invention comprises the sequential steps of:

(1) heating the molding material;

(2) transferring said heated material into the mold;

(3) compressing the preheated material by rapidly closing the mold and then cooling for a prescribed time under pressure; and (4) removing the molded article from the mold.

In step (1), an infrared oven, air oven, induction furnace or varying combinations of these ovens and furnaces may be used as a heating device. The preheating temperature of the molding material is higher than the melting point of the crosslinked crystalline thermoplastic resin but is below the decomposition temperature thereof. The shape of the molding material is generally that of a sheet or film having a thickness of about 0.2–10 mm, preferably about 0.5–5.0 mm. The molding material can be trimmed in accordance with the shape of the molded article.

In step (2), it is necessary that the preheated material be capable of maintaining its shape by itself so as to be manipulated and transferred into the mold. In the present invention, the preheated material maintains its shape excellently by the provision of the crosslinking structure without use of a glass fiber mat. A mold, such as those having matched metal dies, may be used. The mold temperature is controlled between room temperature to below the melting point.

In step (3), the preheated material is compressed between the molds, deformed and cooled. The time and pressure required for this step vary depending on the thickness of the molding articles and the types of crosslinked resins utilized. The temperature and pressure for molding are about 5–100 seconds and 50–1,000 kg/cm$^2$, respectively. It is necessary that the molded article be sufficiently crystallized and solidified in order to prevent it from being deformed by the force needed to remove the article from the mold, such as by the pressure exerted by an ejector pin or the like.

In step (4), the molded article is removed from the mold. The mold may be coated by a lubricant or mold release agent to facilitate ejection of the article.

The molded article made from crosslinked crystalline thermoplastic resin in accordance with this invention has excellent mechanical strength and surface smoothness and can be used in a wide variety of applications.

The present invention will now be further illustrated by the following Examples. However, it is to be understood that these Examples are given merely to explain and not to limit the invention and that numerous changes may be made therein without departing from the spirit and scope of the invention as defined in the appended claims.

EXAMPLE 1

Poly-$\epsilon$-caprolactam, copolymerized with a salt which consists of 1 mol of trimesic acid and 1.5 mol of dodecamethylenediamine (abbreviated as 12.TMS salt in the following description), is prepared by conventional method. The weight fraction of 12.TMS salt in the polymer is 4.86%. Before the crosslinking reaction occurs, the polymer is extruded from the polymerizing apparatus and pelletized to granule form, which granules have dimensions about 1.5 mm$\phi \times$2.5 mm. Monomer and oligomers are extracted from the pellet by boiling in water for 24 hrs., and the pellet is dried for 48 hrs. at 120° C. in vacuo. Using the pellet, sheets having a thickness of 3. 0 mm are prepared by an extrusion method. Then, the sheets are further polymerized in solid phase at 220° C. for 72 hrs. in vacuo. After this treatment, the sheets have a degree of crosslinking of 80%. The crosslinked sheet is heated to 250° C. and is transferred to a mold having a temperature of 120° C. The mold has a cup-shaped dimension which is changed in depth and thickness in accordance with ASTM-D 731-67 to 29 mm and 1.0 mm respectively. The ease in manipulating the preheated sheet is excellent. The mold is closed under a pressure of 150 kg/cm$^2$ for 60 sec. After this operation, the mold is opened and the molded article is removed. The surface of the molded cup is excellently smooth.

For comparison, composite sheets comprising 30 weight % of a continuous glass strand mat, and 70 weight % poly-ε-caprolactam without crosslinking agent are prepared by impregnating the mat with the poly-ε-caprolactam at 270° C. Using this composite sheet, a cup is molded by the same method as mentioned in the preceding paragraph, but the surface smoothness of this cup is inferior because of the "rising up" of the glass strands to the surface of the molded article.

Using a linear poly-ε-caprolactam sheet having no trimesic acid, the mold test is also attempted by the same method as mentioned in the preceding two paragraphs, but it is impossible to manipulate the preheated sheet and transfer the sheet to the mold due to the flowing and deformation of the prepared sheet.

EXAMPLE 2

Poly-hexamethylene-adipamide copolymerized with 2.43 weight % 12.TMS salt is prepared by a conventional method and before the crosslinking reaction occurs, the polymer is extruded and pelletized. Sheets having a thickness of 2.0 mm are made from the pellet by a compression method. The sheets are further polymerized in solid phase at 235° C. for 48 hrs. in vacuo. After this treatment, the degree of crosslinking of the sheets is 85%.

This crosslinked sheet is heated to 280° C. and the cup is molded by the same method as described in Example 1. The ease in manipulating the preheated sheet is excellent and the surface of the molded cup is excellently smooth.

EXAMPLE 3

Poly-ε-caprolactam sheets having thicknesses of 1.5 mm are prepared by an extrusion method. The sheets are irradiated by γ-ray from $^{60}$Co source in an acetylene atmosphere for 200 hrs. at room temperature. The dose rate of γ-ray is 0.25 M rad/hr. The degree of crosslinking of the irradiated sheets is 65%. Using this sheet, a cup is molded by the same method as Example 1. The preheated sheet can be easily manipulated and readily transferred to the mold and the surface of the molded article is excellently smooth.

EXAMPLE 4

300 g of poly-ε-caprolactam powder having particle sizes of below 100 mesh, and 12 g of diepoxide (Shell Chem. "Epikote" 819) are mixed in a Henschel mixer at room temperature. The mixture is fed to a mold which is placed in a hydraulic hot press, with the temperature set at 260° C. Then, the mixture is compressed to form a plate having a thickness of 3.0 mm. After the mold is maintained for 10 minutes in this state, it is cooled by a hydraulic cold press in which water at room temperature is circulating therethrough. After this operation, the sheet has a degree of crosslinking of 65%. Using this sheet, a cup is molded by the same method as in Example 1. The preheated sheet can be easily manipulated and readily transferred to the mold and the surface of the molded article is excellently smooth.

EXAMPLE 5

Poly-ε-caprolactam pellets, copolymerized with 0–7.29 weight % 12.TMS salt, are prepared by the method described in Example 1. Using the pellets, sheets having a thickness of 2.5 mm are molded by a compression method. The sheets are further polymerized in a solid state at 220° C. for 72 hrs. in vacuo. After this treatment, each sheet has a degree of crosslinking as described in Table 1. From these sheets, the cups are molded by the same method as described in Example 1 and the melting temperature, moldability of the crosslinked sheets, mechanical strength, and surface smoothness of the molded articles are evaluated and shown in Table 1. In the case where the sheet is not crosslinked it is possible to mold the cup. In the case where the degree of crosslinking is below 30%, the moldability and mechanical strength of the molded cup and the surface smoothness are poor.

TABLE 1

| 12. TMS Salt (wt %) | Degree of Cross-linking[a] (%) | Melting Point[b] (°C.) | Moldability | Tensile Strength[c] (kg/cm$^2$) | Surface Smoothness[d] |
|---|---|---|---|---|---|
| 0 | 0 | 220 | impossible to transfer the preheated sheet to the mold | — | — |
| 1.46 | 10 | 220 | extraordinary deformation of preheated sheet | 850 | creases are formed partly |
| 1.94 | 32 | 218 | excellent | 900 | excellently smooth |
| 2.43 | 55 | 215 | " | 950 | excellently smooth |
| 4.37 | 90 | 213 | " | 1200 | excellently smooth |
| 7.29 | 94 | 208 | " | 1700 | excellently smooth |

[a] weight fraction of insoluble component of crosslinked sheet after extracting by 88% aqueous solution of formic acid.
[b] endothermic peak temperature measured at heating rate of 10° C./minute by DSC-1B (Perkin Elmer).
[c] evaluated by the specimen in accordance with ASTM D 1822 cut from the bottom of the molded cup
[d] evaluated by human eye

EXAMPLE 6

Polyethylene terephthalate containing 2.0 weight % of trimethyl trimellitate is polymerized by a conventional method and before the crosslinking reaction occurs, the polymer is extruded and pelletized. From the pellet, 2.0 mm thick sheets are prepared by a compression method. The sheets are further polymerized in solid phase at 225° C. for 98 hrs. in vacuo. After this treatment, the sheets have a degree of crosslinking of 60% and a melting point of 254° C. This crosslinked sheet is heated to 275° C. and transferred to the same mold as Example 1 having a temperature of 140° C. The ease in manipulating the preheated sheet is excellent. Immediately after the preheated sheet is put into the mold, the mold is closed under the pressure of 150 kg/cm$^2$ for 60 sec. Then the mold is opened and the molded cup is removed. The surface of this molded artcle is excellently smooth.

For comparison, composite sheets comprising 30 weight % of a glass continuous strand mat and 70 weight % polyethylene terephthalate (having no crosslinking agent) are prepared by impregnating the glass mat with polyethylene terephthalate at 280° C. Using this composite sheet, the cup-shaped article is molded by the same method as described in the preceding paragraph, but the surface smoothness of this molded article is poor because glass fiber strands are raised on the surface.

Using a polyethylene terephthalate sheet containing no trimethyl trimellitate, the mold test is also attempted by the same method as previously mentioned in this Example, but it is impossible to manipulate the preheated sheet and transfer it to the mold because of the flowing and deformation exhibited thereby.

EXAMPLE 7

Polybutylene terephthalate, copolymerized with 1.85 weight % trimethyl trimellitate, is prepared by a conventional method and the polymer is extruded and pelletized before the crosslinking reaction occurs. 3.0 mm thick sheets are compression molded from the pellet. The sheets are further polymerized in a solid state at 205° C. for 98 hrs. in vacuo. After this treatment, the sheets have a degree of crosslinking of 68% and melting points of 222° C. One of these crosslinked sheets is heated to 250° C. and a cup-shaped article is molded by the same method as in Example 6, except that the mold temperature is set at 40° C. The ease in manipulating the preheated sheet is excellent and the surface of the molded cup is excellently smooth.

For comparison, composite sheets comprising 30 weight % of a glass chopped strand mat and 70 weight % polybutylene terephthalate having no crosslinking agent are prepared by impregnating the glass mat with the polybutylene terephthalate at 260° C. Using this composite sheet, a cup is molded by the same method as noted in this Example above, but the surface smoothness of the molded article is poor because glass strands are raised on the surface of the cup.

EXAMPLE 8

Polybutylene terephthalate, copolymerized with 0-2.0 weight % of pyromellitic acid anhydride, is prepared by a conventional method and the polymer is extruded and pelletized before the crosslinking reaction occurs. Using the pellet, 1.5 mm thick sheets are compression molded and further polymerized in a solid phase at 205°±5° C. for 24 hrs. in vacuo. After this treatment, each sheet has a degree of crosslinking as described in Table 2. From these sheets, cups are molded by the same method as in Example 7 and the melting temperature, moldability of the crosslinked sheets, mechanical strength, and surface smoothness of the molded cups are evaluated and shown in Table 2. As can be seen in Table 2, it is clear that the moldability, mechanical strength and surface smoothness of the molded cups are excellent when the degree of crosslinking is over 30%.

TABLE 2

| Pyromellitic acid anhydride (wt. %) | Degree of Crosslinking[a] (%) | Melting Point[b] (°C.) | Moldability | Tensile Strength[c] (kg/cm$^2$) | Surface Smoothness[d] |
| --- | --- | --- | --- | --- | --- |
| 0 | 0 | 224 | impossible to transfer the preheated sheet to the mold | — | — |
| 0.5 | 8 | 223 | extraordinary deformation of preheated sheet | 480 | creases are formed partly |
| 1.0 | 37 | 216 | excellent | 570 | smooth |
| 1.5 | 85 | 207 | " | 715 | excellently smooth |
| 2.0 | 96 | 203 | " | 820 | excellently smooth |

[a] weight fraction of insoluble component of crosslinked sheet after extraction by orthochlorophenol.
[b] endothermic peak temperature measured at heating rate of 10° C./min. by DSC-1B (Perkin Elmer).
[c] evaluated by the specimen in accordance with ASTM D 1822 cut from the bottom of the molded cup
[d] evaluated by human eye

EXAMPLE 9

Poly-ε-caprolactam pellets, copolymerized with 0-7.29 weight % 12.TMS salt, are prepared by the same method as in Example 1. A mixture of the pellets and 6 mm length glass chopped strands is fed to an extruder hopper and 3.0 mm thick sheets are extruded. The glass fiber content in the sheets is 16% in volume. The sheets are further polymerized in solid phase at 215° C. for 72 hrs. in vacuo. After this treatment, each sheet has a degree of crosslinking as described in Table 3. Using this crosslinked sheet, a cup having a bottom radius of 70 mm, height of 30 mm, and thickness of 1.0 mm, is molded. The molding conditions are as follows:

| | |
| --- | --- |
| preheating temperature of the sheet | 250° C. |
| mold temperature | 120° C. |
| compression pressure | 180–230 kg/cm$^2$ |
| compressure time | 45–60 sec. |

The melting temperature and moldability of the crosslinked sheets, mechanical strength and surface smoothness of the molded cups are evaluated and shown in Table 3. In the cases where the degree of crosslinking is over 5%, moldability, surface smoothness and mechanical strength are remarkably improved.

TABLE 3

| 12. TMS Salt (wt. %) | Glass Fiber (vol. %) | Degrees of Crosslinking[a] (%) | Melting Point[b] (°C.) | Moldability | Tensile Strength[c] (kg/cm$^2$) | Surface Smoothness[d] |
| --- | --- | --- | --- | --- | --- | --- |
| 0 | 16 | 0 | 225 | extraordinary deformation of preheated sheet | 1200 | creases are formed |
| 0.73 | 16 | 0 | 226 | extraordinary deformation of preheated sheet | 1200 | creases are formed |
| 1.46 | 16 | 3 | 223 | extraodinary deformation of preheated sheet | 1200 | creases are formed |
| 1.94 | 16 | 5 | 220 | good | 1250 | smooth |
| 2.43 | 16 | 40 | 215 | excellent | 1300 | excellently smooth |
| 2.92 | 16 | 57 | 213 | " | 1450 | excellently smooth |
| 3.64 | 16 | 68 | 213 | " | 1600 | excellently |

TABLE 3-continued

| 12 . TMS Salt (wt. %) | Glass Fiber (vol. %) | Degrees of Crosslinking$^a$ (%) | Melting Point$^b$ (°C.) | Moldability | Tensile Strength$^c$ (kg/cm$^2$) | Surface Smoothness$^d$ |
|---|---|---|---|---|---|---|
| 4.86 | 16 | 90 | 210 | " | 1650 | smooth excellently smooth |
| 7.29 | 16 | 95 | 207 | " | 2150 | excellently smooth |

$^{a, b, c, d}$evaluated by the same method as example 5

EXAMPLE 10

A poly-ε-caprolactam pellet, copolymerized with 2.92 weight % 12.TMS salt, is prepared by the same method as in Example 1. A mixture of this pellet and 7 mm long carbon chopped strands is fed to an extruder hopper. Composite sheets having thicknesses of 2.8 mm are extruded. The content of carbon fiber is varied as described in Table 4. The sheets are further polymerized in a solid phase at 215° C. for 48 hrs. in vacuo. After this treatment, the sheets have a degree of crosslinking of 53% and a melting point of 213° C. Using these sheets, the same cups as in Example 9 are molded, and moldability, mechanical strength and surface smoothness are evaluated and shown in Table 4. A reinforcing effect is not recognized when the carbon fiber content is under 5 volume %, and the surface smoothness is poor when the carbon fiber content is over 65 volume %. A molded article having excellent mechanical strength, moldability and surface smoothness is produced when the carbon fiber content is between 5 and 60 volume %.

TABLE 4

| Carbon Fiber Content (Vol. %) | Degrees of Crosslinking$^a$ (%) | Melting Point$^b$ (°C.) | Moldability | Tensile Strength$^c$ (kg/cm$^2$) | Surface Smoothness$^d$ |
|---|---|---|---|---|---|
| 0 | 53 | 213 | excellent | 1100 | excellent |
| 3 | " | " | " | 1100 | " |
| 5 | " | " | " | 1150 | " |
| 10 | " | " | " | 1350 | " |
| 20 | " | " | " | 2000 | " |
| 30 | " | " | " | 2200 | " |
| 45 | " | " | good | 2300 | smooth |
| 60 | " | " | " | 2500 | " |
| 65 | " | " | bad | 2500 | bad |

$^{a, b, c, d}$evaluated by the same method as Example 5.

EXAMPLE 11

A homogeneous mixture of poly-ε-caprolactam powder, 3 mm long glass chopped fibers, and diepoxide (Shell Chem. "Epikote" 819) is prepared by mixing these ingredients in a Henschel mixer until the glass chopped fibers are completely free from aggregation. The mixing ratio of poly-ε-caprolactam, glass fibers and diepoxide is 67 weight %, 30 weight %, and 3 weight %, respectively. Using this mixture, a 3.0 mm thick sheet is prepared and a cup is molded by the same method as Example 4. The sheet has a degree of crosslinking of 67%. The prepared sheet can be easily manipulated and readily transferred to the mold and the surface of the molded article is excellently smooth.

Having thus described our invention with particularity with reference to the preferred methods of carrying out same, and having referred to certain modifications thereof, it will be obvious to those skilled in the art, after understanding the invention, that other changes and modifications may be made therein without departing from the spirit and scope of the invention, and it is intended that the appended claims should cover such changes as come within the scope of the invention.

We claim:

1. A method for producing thermoplastic resin molded articles which comprises heating a sheet of crystalline crosslinked polyamide or polyester resin, which is crosslinked to a degree of crosslinking of more than about 5% to a temperature higher than the melting point of said crosslinked resin and below the decomposition temperature of the same, transferring said heated sheet to a press mold and press molding said preheated sheet between a pair of press molds maintained at a temperature below the melting point of said crosslinked resin.

2. A method according to claim 1, wherein said polyamide is poly-ε-caprolactam.

3. A method according to claim 1, wherein said polyamide is polyhexamethylene adipamide.

4. A method according to claim 1, wherein said polyester is polyethylene terephthalate.

5. A method according to claim 1, wherein said polyester is polybutylene terephthalate.

6. A method according to claim 1, wherein said crystalline resin is polyethylene.

7. A method according to claim 1, wherein said crystalline resin is polypropylene.

8. A method according to claim 1, wherein said crystalline resin is crosslinked to a degree of crosslinking of more than 30%.

9. A method according to claim 1, wherein said sheet has a thickness of about 0.2 to about 10 mm.

10. A method according to claim 1, wherein said sheet contains about 5 to about 60 volume percent of fibrous reinforcing agent having less than 25 mm length.

11. A method according to claim 1, wherein said sheet contains about 5 to about 60 volume percent of fibrous reinforcing agent having less than 15 mm length.

12. A method according to claim 10, wherein said fibrous reinforcing agent is glass fiber.

13. A method according to claim 10, wherein said fibrous reinforcing agent is carbon fiber.

14. A method according to claim 1, wherein the press-molding of the preheated sheet is carried out under a pressure of about 50 to about 1,000 kg/cm$^2$.

* * * * *